United States Patent [19]

Grimm et al.

[11] Patent Number: 4,554,217

[45] Date of Patent: Nov. 19, 1985

[54] PROCESS FOR CREATING WEAR AND CORROSION RESISTANT FILM FOR MAGNETIC RECORDING MEDIA

[75] Inventors: M. Andreas Grimm, Cupertino; George W. Brock, Los Altos Hills, both of Calif.

[73] Assignee: Verbatim Corporation, Sunnyvale, Calif.

[21] Appl. No.: 652,278

[22] Filed: Sep. 20, 1984

[51] Int. Cl.[4] ................................................. G11B 5/72
[52] U.S. Cl. .................................. 428/469; 148/13.1; 148/16.5; 148/20.3; 148/31.5; 148/31.55; 204/192 D; 204/192 M; 427/131; 427/132; 428/694; 428/695; 428/900
[58] Field of Search .......................... 427/131, 132; 204/192 M, 192 D; 428/694, 900, 469, 336, 695, 408; 148/31.5, 31.55, 13.1, 16.5, 20.3

[56] References Cited

U.S. PATENT DOCUMENTS

| | | | |
|---|---|---|---|
| 3,460,968 | 8/1969 | Bate | 428/472 |
| 3,492,158 | 1/1970 | Scow | 428/694 |
| 3,498,837 | 3/1970 | Alstad | 427/131 |
| 3,795,542 | 3/1974 | Halaby | 204/192 M |
| 4,124,736 | 11/1978 | Patel | 427/130 |
| 4,260,466 | 4/1981 | Shirahata | 427/132 |
| 4,323,629 | 4/1982 | Kunieda | 428/688 |
| 4,354,909 | 10/1982 | Takagi | 427/40 |
| 4,390,562 | 6/1983 | Yanagisawa | 427/11 |
| 4,390,601 | 6/1983 | Ono | 428/412 |
| 4,399,013 | 8/1983 | Sugita | 427/132 |
| 4,411,963 | 10/1983 | Aine | 428/694 |
| 4,418,126 | 11/1983 | Izumi | 428/692 |
| 4,495,242 | 1/1985 | Arai | 428/695 |
| 4,503,125 | 3/1985 | Nelson | 428/408 |

FOREIGN PATENT DOCUMENTS

| | | | |
|---|---|---|---|
| 0065898 | 5/1977 | Japan | 204/192 M |
| 0076399 | 7/1978 | Japan | 204/192 M |
| 0075499 | 7/1978 | Japan | 204/192 M |

OTHER PUBLICATIONS

H. Maeda, "High Coercivity Co and Co-Ni Alloy Films", *J. Applied Physics;* 53(5), May 1982, pp. 3735-3739.

*Primary Examiner*—Ellis P. Robinson
*Attorney, Agent, or Firm*—Thomas E. Schatzel

[57] ABSTRACT

A process for forming a magnetic recording member composed of a substrate, a magnetic film, and a protective layer. The magnetic film is deposited on the substrate by means of DC or RF sputtering and electron beam vacuum deposition in a partial pressure of inert gas. During the final minutes of the sputter process, oxygen or carbon monoxide is injected into the vacuum chamber to form the protective layer.

11 Claims, 2 Drawing Figures

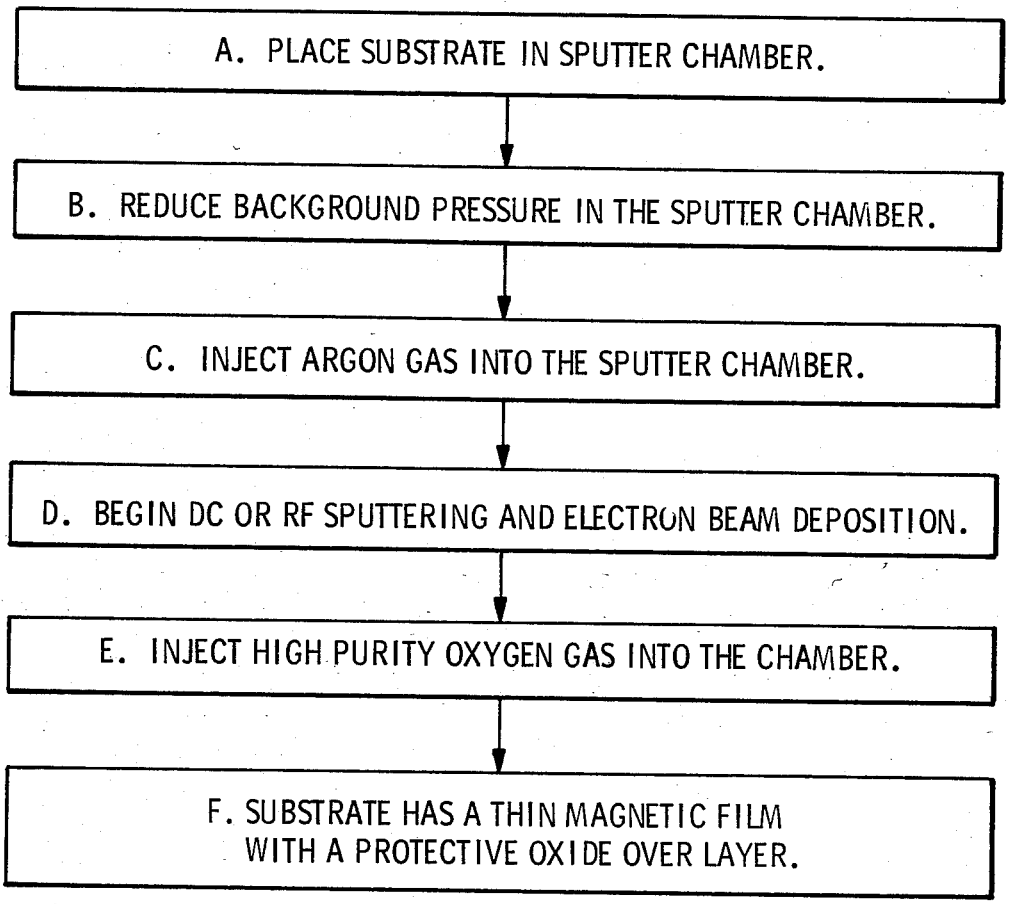
Fig_1
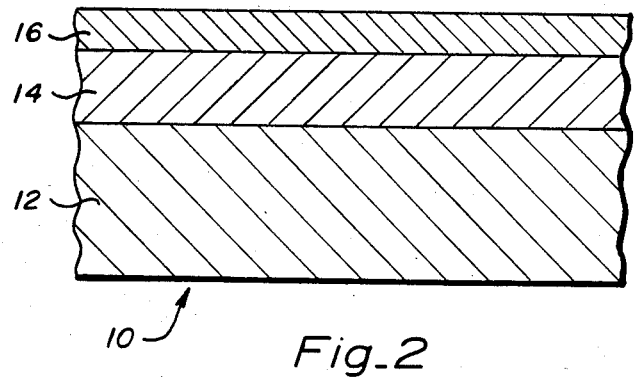
Fig_2

PROCESS FOR CREATING WEAR AND CORROSION RESISTANT FILM FOR MAGNETIC RECORDING MEDIA

BACKGROUND OF THE INVENTION

1. Field of the Invention

The invention relates generally to processes for creating magnetic recording medium and more particularly to processes for creating ferromagnetic metal films which have increased wear and corrosion resistance.

2. Description of the Prior Art

Magnetic recording members, such as disks, are produced by depositing thin magnetic films on a flexible or rigid substrate. The magnetic films can be composed of CoCr or NiCo. The thickness of the finished films range from ten to forty microinches. The formation of the film is commonly achieved by means of DC or RF sputtering and electron beam vacuum deposition.

U.S. Pat. No. 4,399,013, issued to Sugita et al, discloses three methods of producing a magnetic layer of CoCr by vacuum deposition. In the first method an electron gun is used to heat the CoCr to evaporation in a vacuum chamber containing a substrate. The second method adds an electric potential between the substrate and the evaporation source. A third method uses a high frequency electrode between the substrate and the evaporation source, while a positive potential is maintained at the substrate. Other examples of methods for depositing magnetic film include U.S. Pat. No. 4,260,466, issued to Shirahata et al, and U.S. Pat. No. 4,418,126, issued to Izumi et al.

The recording members formed by these processes are used for high density storage in computer systems and the reliability of the recording medium is very important. However, the thin films are subject to wear from frictional contact with the transducer head and to corrosion from deposits of foreign substances.

Attempts have been made to improve the wear characteristics of the magnetic film. For example, U.S. Pat. No. 4,345,909, issued to Takagi et al, discloses a way to produce a magnetic recording medium using chromium dioxide. Metallic chromium or chromium oxide is heated in a crucible in a highly purity oxygen atmosphere to form a cluster composed of chromium dioxide molecules. The process uses an ionized cluster beam apparatus. Another improved wear magnetic film is disclosed in U.S. Pat. No. 4,323,629, issued to Kunieda et al. The film consists substantially of Ni, Co and oxygen.

Another approach to solving the wear problem has been to form a protective overlayer on the magnetic film. U.S. Pat. No. 4,124,736, issued to Patel et al, discloses a magnetic recording member with a protective covering consisting of a barrier layer and an oxide layer. The barrier layer consists of at least one non-magnetic metal which is substantially inert under the conditions employed in forming the oxide layer. This barrier layer is primarily used to protect the magnetic film while the oxide layer is formed. The oxide layer is formed by heating a metal layer in air, oxygen, or other oxygen atmosphere at sufficient temperature and for sufficient time to form the oxide layer. This oxide layer, preferably composed of $Co_3O_4$, has hardness and frictional characteristics which protect the magnetic film from wear.

U.S. Pat. No. 4,268,369, issued to Barlow et al, discloses a process for forming a protective layer of silicon dioxide. A substrate is covered with a magnetic film of Cobalt-Nickel, Colbalt or Colbalt-Nickel-Phosphorus. The magnetic film is then oxidized in air at temperatures from 100° C.–200° C. to provide an intermediate layer to facilitate good adhesion with the silicon dioxide. The silicon dioxide is then sputtered over the oxidized surface.

U.S. Pat. No. 3,498,837, issued to J. K. Alstad et al, discloses a method for forming a protective overlayer of chromium-chromium oxide. The chromium is heated in a soft vacuum of $10^{-3}$ to $10^{-4}$ mm. of Hg in an atmosphere containing oxygen. The chromium-chromium oxide layer is formed directly on the magnetic film.

U.S. Pat. No. 3,460,968, issued to G. Bate et al, discloses a method for forming a $Co_3O_4$ overlayer on magnetic film. Magnetic film containing cobalt is placed in a temperature-humidity chamber until a cobalt oxide layer is sufficiently formed. The process must be done carefully to avoid contact of liquid water with the plated metal and prevent corrosion.

Other protective layers are disclosed in U.S. Pat. No. 4,390,562, issued to Yanagisawa; U.S. Pat. No. 4,390,601, issued to Ono et al; and U.S. Pat. No. 4,411,963, issued to Aine.

The above-mentioned protective layers reduce the wear on the magnetic film. However, none of these methods disclose a way of forming a magnetic film and a protective layer all in one sputter process.

SUMMARY OF THE PRESENT INVENTION

It is therefore an object of the present invention to provide a process for forming a ferromagnetic film and a protective layer during the same sputter process.

It is a further object to provide a process for forming a protective layer faster and more easily than before.

It is a further object to provide a process for forming a protective layer more inexpensively than before.

Briefly, in a preferred embodiment the present invention provides a process for forming a ferromagnetic film and a protective layer on a recording disk. The thin ferromagnetic film is deoposited on a substrate by means of DC or RF sputtering and electron beam vacuum deposition in a partial pressure of an inert gas. During the final minutes of the sputter process, oxygen or carbon monoxide is injected into the vacuum chamber to be deposited over the ferromagnetic film and form a thin protective layer.

An advantage of the present invention is that it provides a process for forming a protective layer and a magnetic layer during the same sputter process.

Another advantage of the invention is that the process of forming a protective layer can be done faster and more easily because the same equipment can be used to form both the ferromagnetic film and the protective layer.

Another advantage is that the thickness of the protective layer can be controlled very precisely.

Another advantage of the invention is that the process of forming a protective layer can be done more inexpensively than before.

Another advantage is that the protective layer is phased into the ferromagnetic film and has excellent adhesive strength.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a flow chart of the steps involved in the process of this invention; and FIG. 2 is a cross-sectional view of the finished product of the process of this invention.

DETAILED DESCRIPTION OF THE PREFERRED EMBODIMENT

The preferred embodiment of the process of this invention is shown in FIG. 1. Starting with Step A, a substrate is placed in a sputter chamber. In Step B, the background pressure in the sputter chamber is reduced to less than $10^{-7}$ mbar. During Step C, argon gas is injected into the sputter chamber to a pressure of 3.5 to $10 \times 10^{-3}$ mbar. Next, in Step D, the DC or RF sputtering and electron beam deposition of CoCr is begun. The CoCr alloy is composed of from seventy to ninety percent cobalt. A thin ferromagnetic film of CoCr is deposited to a thickness of from ten to forty microinches on the substrate. The film exhibits perpendicular magnetization with respect to the substrate plane. During Step E, high purity oxygen is injected into the sputter chamber during the last ten to twenty-five percent of the deposition time cycle at a rate of five to eight cubic centimeters per minute. The total ionizing gas pressure in the sputter chamber is increased by approximately ten percent by this step. In the presence of the oxygen gas, an oxide layer of a few hundred angstroms is formed on the top of the metallic CoCr. The presence of the oxide layer can be dectected visually by observation of the interference colors. The resulting product of Step F has a substrate with a ferromagnetic coating and a protective layer.

FIG. 2 shows a cross-section of the final product produced from the process and is designated by the general reference number 10. The base of the product is a substrate 12. The substrate 12 can be made of flexible or rigid material. On top of the substrate 12 is a ferromagnetic film 14. In the preferred embodiment the ferromagnetic film 14 is made of CoCr. A protective layer 16 covers and protects the ferromagnetic film 14 from corrosion and wear.

The recording medium produced by this process exhibits improved wear characteristics. No wear tracks were observed after a several hour wear test of a recording disk produced using the process. By contrast, films produced by the conventional process were destroyed within a few seconds.

An alternative embodiment of the process of this invention is to use NiCo, instead of CoCr, as the ferromagnetic film 14. An oxide protective layer 16 is formed which is similar to that of the preferred embodiment.

A different embodiment of the process of the invention is to substitute carbon monoxide for oxygen. Carbon monoxide is injected into sputter chamber during the final minutes of the sputter process. When CoCr is used as the ferromagnetic film 14, a hard Cr and Co carbide film is formed as the protective layer 16. Other ferromagnetic films such as NiCo can also be used.

Although the present invention has been described in terms of the presently preferred embodiment, it is to be understood that such disclosure is not to be interpreted at limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A wear and corrosion resistant magnetic recording member comprising:
    a substrate;
    a ferromagnetic recording layer; and
    a protective layer composed of a ferromagnetic carbide film.

2. A wear and corrosion resistant magnetic recording member as recited in claim 1 wherein:
    the recording layer and the protective layer are comprised of the same ferromagnetic metal.

3. A wear and corrosion resistant magnetic recording member as recited in claim 2 wherein:
    the ferromagnetic metal is CoCr; and
    the protective layer is composed of a hard Cr and Co carbide film.

4. A wear and corrosion resistant magnetic recording member as recited in claim 2 wherein:
    the ferromagnetic metal is NiCo; and
    the protective layer is comprised of hard Co carbide film.

5. The method of producing a wear and corrosion resistant magnetic recording film in the steps of:
    depositing a thin ferromagnetic metal recording film on the substrate by means of DC or RF sputtering and electron beam vacuum deposition, done in the presence of an inert gas at partial pressure; and
    injecting high purity carbon monoxide gas into the sputter chamber during the final minutes of the sputter process sufficient to form a protective carbide layer on the recording film.

6. The method of claim 5 wherein
    the magnetic film is composed of a transition metal or a transition metal alloy.

7. The method of claim 5 wherein:
    the ferromagnetic metal is CoCr or NiCo.

8. The method of claim 7 wherein:
    the inert gas is argon.

9. The method of claim 8 wherein
    the background pressure is reduced to less than $10^{-7}$ mbar prior to injecting the argon gas into the sputter chamber; and
    the sputter deposition is done at the partial pressure of 3.5 to $10 \times 10^{-3}$ mbar.

10. The method of claim 9 wherein
    the high purity carbon monoxide gas is injected into the sputter chamber during the final minutes of the sputter process at a rate of five to eight cubic centimeters per minute.

11. The method of claim 10 wherein
    the protective carbide layer is a few hundred angstroms thick.

* * * * *